United States Patent [19]

Suzuki et al.

[11] Patent Number: 4,483,966
[45] Date of Patent: Nov. 20, 1984

[54] PROCESS FOR PRODUCING MODIFIED POLYPROPYLENE

[75] Inventors: Takeshi Suzuki, Ichiharashi; Hiroshi Shimizu, Chibaken; Nobutoshi Komori, Ichiharashi; Takehiro Umeno, Ichiharashi; Atsuyoshi Shimizu, Ichiharashi, all of Japan

[73] Assignee: Chisso Corporation, Tokyo, Japan

[21] Appl. No.: 421,243

[22] Filed: Sep. 22, 1982

Related U.S. Application Data

[63] Continuation of Ser. No. 278,069, Jun. 29, 1981, abandoned.

[30] Foreign Application Priority Data

Dec. 12, 1980 [JP] Japan .................. 55-175523

[51] Int. Cl.$^3$ ............................ C08F 297/08
[52] U.S. Cl. .................... 525/323; 525/245
[58] Field of Search ......................... 525/323

[56] References Cited

U.S. PATENT DOCUMENTS 4,284,739 8/1981 Zukowski ................. 525/323

Primary Examiner—Paul R. Michl

Attorney, Agent, or Firm—Fred Philpitt

[57] ABSTRACT

A process for producing ethylene-propylene block copolymer by the use of a catalyst employed for producing isotactic polypropylene is provided. This process is characterized in that a gas phase polymerization of propylene is substantially carried out in the presence of the catalyst obtained by combining a titanium trichloride composition with an average particle size of 10~100 $\mu$ and an organic aluminum to form the propylene polymer segment with a specific surface area more than 0.015 m$^2$/g at a yield of more than 3,000 g per 1 g of the titanium trichloride composition in the first step, and then a gas phase polymerization of a mixture of polypropylene and ethylene is successively carried out in the second step to form the copolymer segment with a copolymerization ratio of propylene:ethylene being 5~80 weight %:95~20 weight %, wherein the polymerized amount of the second step is 10–40% of total polymerized amount and wherein normal hexane extraction ratio (75° C., 1 hour) of the ethylene-propylene block copolymer powders obtained is 1~10 weight %. The process of the present invention is one having an extremely high productivity industrially, and the modified polypropylene obtained has a superior low-temperature-impact strength and brittle temperature.

5 Claims, No Drawings

PROCESS FOR PRODUCING MODIFIED POLYPROPYLENE

This application is a continuation of application Ser. No. 278,069, filed June 29, 1981, now abandoned.

DESCRIPTION OF THE INVENTION

The present invention relates to a process for producing a modified polypropylene. More particularly, it relates to a process for producing a propylene-ethylene block copolymer by a gas phase multi-steps copolymerization method.

Hitherto, in the case of producing a modified polypropylene by a slurry polymerization method using an inert hydrocarbon as a polymerization solvent, it is carried out as follows: At first propylene is substantially polymerized by using a high stereospecific catalyst system comprising a titanium compound and an organic aluminum compound to form the propylene polymer segment, and thereafter polymerization of ethylene or a mixture of ethylene and propylene is substantially carried out to form the ethylene-propylene copolymer segment. The polymer produced by polymerization of ethylene and propylene is generally soluble in any polymerization solvent and viscous by nature, but in a process for producing a modified polypropylene by an actual slurry polymerization, the polymer which is soluble in the polymerization solvent is usually separated from the modified polypropylene.

On the other hand, a method in which propylene is polymerized in a gas phase using a catalyst system comprising a titanium compound and an organic aluminum compound is also known. Since, in a process for producing a modified polypropylene by a gas phase polymerization method, any tacky component such as the soluble polymer in a slurry polymerization may be contained in the modified polypropylene, the modified polypropylene particles formed have tendency to become tacky and coagulated, and furthermore under certain case a polymerization vessel may be blocked.

An object of the present invention is to solve the above-mentioned problems in a production of a modified polypropylene by a gas phase polymerization.

The process for producing of the modified polypropylene by the present invention is characterized by the following procedures: In the production of the ethylene-propylene block copolymer by the use of catalysts employed for producing isotactic polypropylene, a gas phase polymerization of propylene is substantially carried out in the presence of the catalyst obtained by combining a titanium trichloride composition with an average particle size, of $10 \sim 100\mu$ and an organic aluminum to form the propylene polymer segment with a specific surface area more than 0.015 m$^2$/g at a yield of more than 3,000 g per 1 g of the titanium trichloride composition in the first step, and then a gas phase polymerization of a mixture of polypropylene and ethylene is successively carried out in the second step to form the copolymer segment with a copolymerization ratio of propylene:ethylene being $5 \sim 80$ weight %:$95 \sim 20$ weight %, wherein the polymerized amount of the first step is $60 \sim 90\%$ of the total polymerized amount and the polymerized amount of the second step is $10 \sim 40\%$ of total polymerized amount and wherein normal hexane extraction ratio (75° C., 1 hour) of the ethylene-propylene block copolymer powder obtained is $1 \sim 10$ weight %.

The catalysts employed for producing isotactic polypropylene which are used in the present invention may be those generally used for stereospecific polymerization of propylene, ethylene, etc. Most typically, catalysts comprising a titanium trichloride composition and an organic aluminum compound component is used. The term "comprising" herein used is referred to the both cases in which only these two components are contained and in which additional assistant components such as an electron donor compound or a carrier (for example magnesium compound) are also contained. The form by which these components being present in the catalysts is not cared. They may also include pulverized, heat treated or any other treated ones.

As the titanium trichloride composition, there may be mentioned titanium trichloride obtained by reducing titanium tetrachloride using metallic aluminum or an organic aluminum compound; one activated by milling the said titanium trichloride; pulverized mixture of the above mentioned titanium trichloride and an electron donor compound; one obtained by deposition out of liquefied titanium trichloride in the presence of an ether compound; one obtained by a method disclosed in Japanese Application Laid-Open No. 34478/1972; and supported ones obtained by contacting titanium tetrachloride, magnesium compound and an electron donor compound.

It is important in the present invention that the average particle size of the titanium trichloride composition (average weight value of particle size measured by a wet method) being in the range of $10 \sim 100\mu$, preferably about $30 \sim 80\mu$. The particle size distribution is preferably as narrow as possible, and it is desirable not to contain any ultra-fine in huge particles or to contain those only in a very small amount (for example, less than 10 weight % of $\leq 1\mu$ or less than 10 weight % of $\geq 300\mu$). In the case of using one with the average particle size lower than the above-mentioned range, it is not suitable since catalyst fine powders and polymer powders are accumulated on recycle gas pipes from the first step polymerization step, and the long-term continuous operation is thus become impossible. On the other hand, in the case of using one with the average particle size more than the above-mentioned range, it is also not suitable since only the modified copolymer having an extremely low drop impact strength at a low temperature is obtained.

The organic aluminum compound is expressed by the general formula,

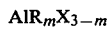

$$AlR_mX_{3-m}$$

wherein R is hydrogen or a hydrocarbon radical with $1 \sim 10$ carbon atoms, particularly an alkyl radical, X is halogen or an alkoxy radical with $1 \sim 12$ carbon atoms, and $1 \leq m \leq 3$. The following compounds may be mentioned as specific examples; triethyl aluminum, tri-n-propyl aluminum, tri-iso-propyl aluminum, tri-iso-butyl aluminum, diethyl aluminum chloride, di-iso-butyl aluminum chloride, diethyl aluminum iodide, etc.

It is possible to add any various type of an electron donor compound as the third component of the polymerization catalyst system in order to improve qualities of the catalyst. The following compounds may be mentioned as the electron donor compound: (a) ethers, such as diethyl ether, di-normalbutyl ether, di-isoamyl ether, tetrahydrofuran, dioxane, diethylene glycohol dimethyl ether, diphenyl ethers; (b) carboxylic esters, such as methyl formate, ethyl acetate, ethyl benzoate, ethyl toluate, methyl methacrylate, etc.; (c) ketones, such as methyl ethyl ketone, acetophenone, etc.; (d) aldehydes; such as acetoaldehyde, isobutylaldehyde, benzaldehyde, etc.; (e) amines, nitriles and acid amides, such as diethyl amine, aniline, acetonitrile, acrylamide, tetramethyl area, etc.; (f) phosphorus compounds, such as triphenyl phosphine, triphenyl phosphite, triphenyl phosphate, etc.; (g) sulphur compounds such as carbon disulphide, methyl phenyl sulphone, etc.

Polymerization process in the first step of the process of the present invention is same as the process for isotactic polypropylene using ordinal stereospecific catalysts. That is, the monomer is substantially consisted of propylene, wherein the case it being consisted only of propylene is most preferable, but a small amount of a copolymerizable monomer, such as ethylene, butene-1, etc. may be used in admixture. For example, when ethylene is used, its amount should be such that ethylene content in the propylene polymerized segment being less than 5 weight %. It is preferably less than 3 weight %, and most preferably less than 2 weight %.

It is important in the present invention that polymerization should be carried out so as to form more than 3,000 g, preferably more than 5,000 g, of polymer per 1 g of the titanium trichloride composition. When less than 3,000 g of the polymer is formed, the modified polypropylene obtained has a very high n-hexane extraction ratio, and the modified polypropylene powders formed may become tacky and coagulated in the polymerization vessel, which may make the continuous polymerization impossible in the worst case, so it is not preferable. Further, the polymerization ratio of the first step polymerization should be maintained at from 60 to 90%, preferably from 70 to 89%, of the total polymerized amount. When the polymerization ratio is lower than the above-mentioned range, the modified polypropylene with a low stiffness is obtained and further the modified polypropylene powders formed become tacky and coagulated in the polymerization vessel, which may make the continuous polymerization impossible in the worst case, and so it is not preferable. When the polymerization ratio exceeds the above-mentioned range, only the modified polypropylene with a low low-temperature-impact strength can be obtained. The molecular weight in the first step is controlled by the hydrogen concentration of the gas phase part.

It is important to select the specific surface area of the polymer powders obtained in the first step being more than 0.015 m$^2$/g, preferably more than 0.05 m$^2$/g, and most preferably more than 0.10 m$^2$/g. When the specific surface area of the polymer powders is lower than 0.015 m$^2$/g, it is found very surprisingly that the final copolymer powders may become very tacky and coagulated, which may make the gaseous multi-steps polymerization difficult, and so it is not preferable. The specific surface area of the polymer powders may be changed by the kind and particle size of the titanium trichloride composition used as well as by the catalyst efficiency, and furthermore it is affected very much by the removal property of micro heat near the catalyst in the polymerization atmosphere.

After the propylene polymerized segment is formed to the specified amount in the first step, polymerization of the second step is successively carried out using the mixture of propylene and ethylene. Polymerization of the second step may be successively carried out with the mixture of propylene and ethylene (which may be supplied to the polymerization system not in admixed state), either after the substantially total amount of the unreacted propylene in the first step polymerization is purged from the polymerized system or in the state wherein the unreacted propylene being remained. The mixing ratio of propylene and ethylene may be undergone a change in the polymerization time. The molecular weight in the second step is controlled by the hydrogen concentration of the gas phase part.

It is important in the second step that the polymerization ratio, namely the ratio of the polymerized amount in the second step to the total polymerized amount, being from 10 to 40%, preferably from 11 to 30%. Further, the copolymerization ratio (by weight) of the propylene-ethylene copolymer segment formed should be 5~80:95~20, preferably 15~80:85~20, and most preferably 25~50:75~50. In an its embodiment, the ethylene concentration (volume %) of the gas phase part in the second step should be maintained at 5~65%, preferably 10~50%, and most preferably 15 to 40%. When the polymerization ratio is lower than 10% of the total polymerized amount, only the modified polypropylene with a low low-temperature-impact strength can be obtained. When it exceeds 40%, the modified polypropylene with a low stiffness may be obtained, and furthermore the modified propylene powders formed may become viscous and coagulated in the polymerization vessel, which may make the continuous polymerization impossible, and so it is not preferable. When the ethylene concentration in the gas phase is not within the above-mentioned range, only the modified polypropylene with a low low-temperature-impact strength may be obtained, and so it is not preferable.

Polymerization procedures in the first and second steps of the present invention may be operated in a batch system wherein both procedures being carried out in the same gas phase polymerization vessel, or in a continuous system wherein polymer formed in one or more than one polymerization vessel in the first step being conveyed to one or more than one polymerization vessel in the second step to polymerize it using gas phase polymerization vessels under different polymerization conditions.

The ethylene content of the modified polypropylene obtained in the present invention is controlled within the range of 3~30 weight %, preferably 5~25 weight %, and most preferably 7~20 weight %. When it is lower than 3 weight %, it is not preferable because of its notably lowered low-temperature-impact strength. When it exceeds 30 weight %, the low-temperature-impact strength is eminently improved, but its stiffness is notably lowered and its property balance is also notably damaged. Furthermore, the tackiness of the final copolymer powders formed is eminently increased and the powders become coagulated, which may make the gas phase multi-steps polymerization difficult, and so it is not preferable.

The extraction ratio (extraction conditions: temperature; 75° C., period; 1 hour) of the modified polypropylene powders obtained in the present invention using normal hexane is controlled to be lower than 10 weight %, preferably lower than 5 weight %, and particularly preferably lower than 4 weight %. When the extraction ratio exceeds 10 weight %, the tackiness of the final copolymer powders is eminently increased and the powders become coagulated, which may make the gas phase multi-steps polymerization difficult. The method to control the n-hexane extraction ratio of the modified polypropylene lower than 10% may be any one so long as it being in the range of the present invention. As the preferred catalyst systems, the following compounds may be mentioned:

(1) combination of diethyl aluminum chloride and the titanium trichloride composition which is obtained by reacting titanium tetrachloride, an organic aluminum compound and an organic ether, and thereafter treating them with titanium tetrachloride, an ether compound or a reaction product of titanium tetrachloride and an ether compound.

(2) one obtained by adding triethyl aluminum to the above-mentioned combination in an amount of less than 1.5 (molar ratio) of triethyl aluminum per diethyl aluminum chloride.

(3) combination of a titanium trichloride composition prepared from a solid product obtained by reacting magnesium hydroxide and aluminum chloride, and ethyl benzoate, silicon tetrachloride with titanium tetrachloride, and triethyl aluminum.

(4) one obtained by adding methyl para toluene to the above-mentioned catalyst system in an amount of 0.01~0.25 (molar ratio) of methyl para toluate per triethyl aluminum.

As to the titanium trichloride composition described in (1) and (2), there may be mentioned the following compound more specifically;

(a) one obtained by reducing titanium tetrachloride with an organic aluminum compound, removing excess titanium tetrachloride, reacting the reduced solid product with an organic ether compound, removing an unreacted organic ether, and treating the product with titanium tetrachloride or with titanium tetrachloride and an organic ether (for example, titanium trichloride composition A in Examples).

(b) one obtained by reacting a reaction product of an organic aluminum compound and an organic ether with titanium tetrachloride to obtain a solid product and then reacting the product with an organic ether compound and titanium tetrachloride (for example, titanium trichloride composition B in Examples).

(c) one obtained by reacting a reaction mixture of titanium tetrachloride and an organic ether with an organic aluminum compound and then reacting them with an organic ether compound (for example, titanium trichloride composition C in Examples).

As the titanium trichloride compositions (3) and (4), there may be mentioned one obtained by mixing and pulverizing magnesium hydroxide and aluminum chloride to obtain a product, adding ethyl benzoate and silicon tetrachloride to it and pulverize to obtain a product, and reacting the product with titanium tetrachloride (for example, titanium trichloride composition D in Examples).

The polymerization catalyst system employed in the present invention may be used in a suspended state in an inert hydrocarbon or liquefied propylene. However, there may be preferably carried out a procedure wherein the catalyst system after subjected to a pretreatment of the catalyst before the first step polymerization by polymerizing a small amount of α-olefins (such as ethylene, propylene, butene-1, etc.) if required, is then introduced into the first step gas phase polymerization vessel. Polymerization may be carried out in both the first and second steps at a temperature in the range of 40°~100° C., preferably 50°~90° C. Polymerization pressure may be selected due to the kind of catalyst used, resident time, property of the gas phase polymerization vessel as well as removal capacity and system of polymerization system, and it may be generally from 1 to 30 Kg/cm$^2$G. As the polymerization vessel employed in the present vessel, there may be mentioned a reactor equipped with a stirrer to stir the catalyst and the modified polypropylene formed mechanically (see for example Japanese Patent Application Laid-open No. 86584/1976), a fluidized bed reactor to carry out tank stirring by gas upwardly stream, and the other known gaseous polymerization reactors.

When the production of the modified polypropylene is carried out according to the present invention, the modified polypropylene with a notably low tackiness and a good fluidity of powders can be prepared. Furthermore, there may be appreciated that the bulk density of the modified polypropylene powders obtained being increased, the removal of polymerization heat in the gas phase polymerization vessel being carried out better, an increasement of powder content, namely an increasement of residence time being obtained, a space yield being increased and adhesion of catalyst or powders to the wall of the gas phase polymerization vessel being decreased. Because of these advantages, the continuous operation of gaseous polymerization for the modified polypropylene, that is ethylene-propylene block copolymer, may be practical. The process of the present invention is one having an extremely high productivity industrially, and the modified polypropylene obtained has a superior low-temperature-impact strength and brittle temperature. This invention is characterized by that the tackiness of the modified polypropylene powder obtained by this invention varies markedly according to the specific surface of the polymer formed in the first stage. This reason is assumed that the variation is caused by the morphological change of formed polymer related to the initial stage in the first stage of polymerization.

The present invention will be further illustrated below by way of Examples and Comparative examples.

PREPARATION OF TITANIUM TRICHLORIDE COMPOSITION (A)

2.7 of normal hexane and 0.69 l of titanium tetrachloride were introduced into a 15 l capacity reactor with a stirrer (rotation speed: 200 rpm), inside of which being maintained under nitrogen atmosphere, and then cooled to 0° C. Thereafter, 3.4 l of hexane and 0.78 l of diethyl aluminum chloride (hereinafter referred to DEAC) were added at 0° C. for 4 hours. They were stirred at this temperature for 1 hour and then at 65° C. for 1 hour to carry out reaction, and allowed to cool to the room temperature. The upper layer, a liquid part, was separated, and the sedimented layer, a solid, was washed with hexane for 5 times. The solid was then reacted with 9.8 l of hexane and 1.37 l of diisoamyl ether at 35° C. for 100 minutes with stirring. After the reaction being ended, the supernatant liquid was separated by settling and the residual sedimented layer, a solid product, was washed with hexane, and then 3.9 l of hexane and 1.0 l of titanium tetrachloride were added for 60 minutes. They were stirred at 65° C. for 2 hours, freed from the supernatant liquid after settling and obtained precipitations were then washed with hexane and dried under the reduced pressure to obtain 1 Kg of titanium trichloride composition (A).

PREPARATION OF TITANIUM TRICHLORIDE COMPOSITION (B)

0.4 gram moles (hereinafter referred to moles simply) of titanium tetrachloride was introduced into a 2 l capacity reactor made of glass which had been purged with nitrogen and heated to maintain at 35° C. Said titanium tetrachloride was mixed with the next reaction liquid, that is a mixture of 60 ml of n-hexane, 0.05 mole of DEAC and 0.12 mole of diisoamyl ether, at 25° C. for 1 minute and then the reaction product obtained after reacting for 5 minutes (molar ratio of diisoamyl ether/DEAC:2.4/1) was added dropwise at 35° C. for 30 minutes. The reaction mixture of titanium tetrachoride was maintained at 35° C. for 30 minutes, and then raised to 75° C. to react for 1 hour, which formed solid precipitation. Said mixture was allowed to be cooled to the room temperature (20° C.) to separate precipitations and supernatant liquid, and the latter was then removed by inclining the reaction vessel. Thereafter, 400 ml of n-hexane was added to the precipitation obtained after the removal of the supernatant liquid, the stirring and mixing for 10 minutes followed by removal of the supernatant liquid by decantation and inclining were carried out, which procedures were repeated for 4 times. Said precipitations after subjected to these treatment were freed from coexistent n-hexane by evaporation to dry under a reduced pressure to give 19 g of solid product. Total amount of said solid product was introduced into a 2 l capacity reactor made of glass, 300 ml of n-hexane was added and stirred to be suspended in, and 16 g of diisoamyl ether and 35 g of titanium tetrachloride were added at 20° C. and reacted at 65° C. for 1 hour. After the reaction period, they were cooled to the room temperature and allowed to separate precipitations (hereinafter referred to the second precipitations) and the supernatant liquid, and then the latter was removed by inclining. 400 ml of n-hexane was added to the second precipitations obtained after removal of the supernatant liquid followed by stirring and mixing for 10 minutes and removal of the supernatant liquid by decantation were carried out, which procedures were repeated for 4 times. Said solid product was then dried under the reduced pressure to obtain 15 g of titanium trichloride composition (B).

PREPARATION OF TITANIUM TRICHLORIDE (C)

25 l of monochlorobenzene-n-heptane mixture solvent having a monochlorobenzene concentration of 43~60 volume % was introduced in a 50 l capacity reactor equipped with a stirrer, and then 2.4 l of titanium tetrachloride was added. 4.6 l of dinormal butyl ether was added dropwise with stirring for 10 minutes. The temperature was maintained at 20° C. 1.4 l of diethyl aluminum chloride was then added dropwise for 40 minutes. They were then heated at the ratio of 1° C./3 minutes, and when the temperature being reached to 55° C., additional 1.0 l of di-n-butyl ether was added dropwise for 30 minutes. The temperature at the end of dropwise addition was 65° C. They were heated to 90° C. to deposit a solid component, and maintained for additional 30 minutes. The solid component was washed with 10 l of monochlorobenzene twice and with 20 l of n-heptane for 3 times, and dried at room temperature under the reduced pressure to obtain 3.5 Kg of titanium trichloride composition (C) with a particle size of 10~120μ.

PREPARATION OF TITANIUM TRICHLORIDE COMPOSITION (D)

12.16 g of $Mg(OH)_2$ anhydride and 27.84 g of $AlCl_3$ anhydride were pulverized in a ball mill at 200° C. for 24 hours. Furthermore, 13.3 ml of ethyl benzoate and 6.6 ml of silicon tetrachloride were added, and continued to pulverize for 48 hours. 40 g of the pulverized product thus obtained and titanium tetrachloride were reacted in a reactor equipped with a stirrer at 80° C. for 3 hours. The product was washed with 300 ml of purified n-hexane for 5 times to obtain 42 g of titanium trichloride composition (D).

EXAMPLES 1~16, COMPARATIVE EXAMPLES 1~11

A lateral type polymerization vessel equipped with a stirrer having a stirring propeller (L/D=5, content volume=860 l, rotation speed=60 rpm) was thoroughly dried, and inside of the vessel was purged with nitrogen. A titanium trichloride composition, an organic aluminum compound, the other compounds and thoroughly purified and dried propylene were continuously fed to the above-mentioned vessel, and the gas phase continuous polymerization in the first step was carried out in the presence of polypropylene powder bed formed. The conditions are shown in Tables. Molecular weight of polypropylene formed was controlled by the hydrogen concentration (0.5~4 volume %) of the gas phase part in the polymerization vessel. Polymerization period was controlled by the level of polypropylene powder bed formed. Polymerization heat generated in the polymerization vessel was removed by adding liquefied propylene into the polymerization vessel. Propylene vaporized in the polymerization vessel was removed from the vessel to cool a heat exchange unit.

Propylene gas removed from the first step polymerization and polymer formed were immediately introduced into the second step polymerization vessel (a lateral type polymerization vessel equipped with a stirrer having a stirring propeller inside, L/D=5, content volume=500 l, rotation speed=80 rpm), and ethylene and propylene, if required, were fed to carry out gas phase continuous polymerization under the conditions shown in Tables. Molecular weight of copolymer formed in the second step was controlled by hydrogen. In Comparative example 10 and Example 16, triethyl aluminum was added. The modified polypropylene powders removed from the second step polymerization vessel were mixed with 0.1 weight % of BHT and 0.1 weight % of calcium stearate after deactivation of the catalyst. After making granules, they were subjected to injection molding to form test pieces.

In Tables, DEAC denotes diethyl aluminum chloride, TEA denotes triethyl aluminum, and $C_2^=$ and $C_3^=$ denote ethylene and propylene, respectively. Values expressed in Tables were measured by the following methods.

Yield: yield (g) of polymer formed per 1 g of titanium trichloride composition, intrinsic viscosity [η]: measured at 135° C. in tetralin solution specific surface area: 5 g of polymer powders obtained by the first step polymerization was degassed in vacuum at 80° C. for 30 hours, and thereafter measured using adsorptive gas Kr.

$C_2^=$ concentration in the gaseous phase: measured by gas chromatography and calculated from the following equation;

$$\frac{\text{ethylene (volume)}}{\text{ethylene (volume)} + \text{propylene (volume)}} \times 100,$$

$C_2^=/C_3^=$ ratio and $C_2^=$ content: measured by an infrared spectroscopic method, MFR: it denotes melt index according to ASTM-D1238, extraction ratio: 50 g of sample (the modified polypropylene powders formed) and 700 ml of n-hexane were added to a stirrable autoclave and subjected to a stirring treatment under the conditions such as 75° C. and 1 hour, and then filtered. Extraction ratio is calculated from the weights measured before and after treatment according to the following equation;

$$\text{extraction ratio (\%)} = \frac{\text{decreasement in weight between values measured before and after treatment (g)}}{50 \text{ (g)}} \times 100$$

izod strength: it denotes izod impact strength according to JIS-K7110 (with notch)

drop impact strength: it denotes du-Pont impact (thickness of test piece; 2 mm) ($-20°$ C.), compression ratio: calculated from bulk density after tapping $\rho$ (g/cm$^3$) and bulk density without tapped $\rho_o$ (g/cm$^3$), according to the following equation (at room temperature): $(\rho - \rho_o)/\rho \times 100$ bending modulus: according to JIS K7208.

TABLE 1

| | catalyst system | | | | the first step polymerization | | | | | |
|---|---|---|---|---|---|---|---|---|---|---|
| | titanium trichloride composition | | organic aluminum | | conditions | | | | polymer | |
| Ex. No. | kind | average particle size, μ | kind | amount g/hr | temp. °C. | pressure Kg/cm²G | period hr | yield*2 g/g | [η] dl/g | specific surface area M²/g |
| Ex.-1 | C | 20 | DEAC | 19.3 | 80 | 20 | 3.0 | 7041 | 1.7 | 0.726 |
| Ex.-2 | C | 40 | DEAC | 22.5 | 80 | 20 | 3.0 | 6384 | 1.5 | 0.297 |
| Ex.-3 | C | 60 | DEAC | 23.4 | 80 | 20 | 3.0 | 6000 | 1.6 | 0.094 |
| Ex.-4 | C | 80 | DEAC | 26.4 | 80 | 20 | 3.0 | 5357 | 1.7 | 0.052 |
| Ex.-5 | C | 90 | DEAC | 26.4 | 80 | 20 | 3.0 | 5012 | 1.5 | 0.021 |
| Comp. ex.-1 | C | 5 | DEAC | 16.5 | 80 | 20 | 3.0 | 7746 | 1.6 | 0.941 |
| Comp. ex.-2 | C | 120 | DEAC | 32.6 | 80 | 20 | 3.0 | 3980 | 1.5 | 0.007 |
| Ex.-6 | B | 30 | DEAC | 25.3 | 80 | 20 | 3.0 | 7265 | 1.6 | 0.413 |
| Ex.-7*1 | D | 20 | TEA | 105.9 | 80 | 10 | 3.0 | 6759 | 1.7 | 0.825 |
| Comp. ex.-3 | A | 31 | DEAC | 51.5 | 70 | 12 | 2.0 | 2590 | 1.7 | 0.621 |
| Ex.-8 | A | 20 | DEAC | 34.9 | 70 | 12 | 3.0 | 3950 | 1.6 | 0.317 |
| Ex.-9*3 | A | 45 | DEAC | 22.5 | 80 | 20 | 3.0 | 6200 | 1.5 | 0.251 |
| Ex.-10 | B | 20 | DEAC | 21.4 | 70 | 23 | 3.0 | 8100 | 1.7 | 0.756 |
| Ex.-11 | B | 20 | DEAC | 17.0 | 90 | 25 | 3.0 | 10500 | 1.6 | 0.712 |
| Comp. ex.-4 | C | 40 | DEAC | 50.2 | 80 | 20 | 1.0 | 2450 | 1.7 | 0.431 |



| | catalyst system | | | | the first step polymerization | | | | | |
|---|---|---|---|---|---|---|---|---|---|---|
| | titanium trichloride composition | | organic aluminum | | conditions | | | | polymer | |
| Ex. No. | kind | average particle size, μ | amount g/hr | kind | amount g/hr | temp. °C. | pressure Kg/cm²G | period hr | yield*2 g/g | [η] dl/g | specific surface area M²/g |

| Ex. No. | kind | avg particle size μ | amount g/hr | kind | amount g/hr | temp °C | pressure Kg/cm²G | period hr | yield*2 g/g | [η] dl/g | specific surface area M²/g |
|---|---|---|---|---|---|---|---|---|---|---|---|
| Ex.-1 | C | 20 | 8.4 | DEAC | 19.3 | 80 | 20 | 3.0 | 7041 | 1.7 | 0.726 |
| Ex.-2 | C | 40 | 9.2 | DEAC | 22.5 | 80 | 20 | 3.0 | 6384 | 1.5 | 0.297 |
| Ex.-3 | C | 60 | 10.2 | DEAC | 23.4 | 80 | 20 | 3.0 | 6000 | 1.6 | 0.094 |
| Ex.-4 | C | 80 | 11.5 | DEAC | 26.4 | 80 | 20 | 3.0 | 5357 | 1.7 | 0.052 |
| Ex.-5 | C | 90 | 12.0 | DEAC | 26.4 | 80 | 20 | 3.0 | 5012 | 1.5 | 0.021 |
| Comp. ex.-1 | C | 5 | 7.2 | DEAC | 16.5 | 80 | 20 | 3.0 | 7746 | 1.6 | 0.941 |
| Comp. ex.-2 | C | 120 | 14.2 | DEAC | 32.6 | 80 | 20 | 3.0 | 3980 | 1.5 | 0.007 |
| Ex.-6 | B | 30 | 11.0 | DEAC | 25.3 | 80 | 20 | 3.0 | 7265 | 1.6 | 0.413 |
| Ex.-7*1 | D | 20 | 11.3 | TEA | 105.9 | 80 | 10 | 3.0 | 6759 | 1.7 | 0.825 |
| Comp. ex.-3 | A | 31 | 22.4 | DEAC | 51.5 | 70 | 12 | 2.0 | 2590 | 1.7 | 0.621 |
| Ex.-8 | A | 20 | 15.2 | DEAC | 34.9 | 70 | 12 | 3.0 | 3950 | 1.6 | 0.317 |
| Ex.-9*3 | A | 45 | 9.6 | DEAC | 22.5 | 80 | 20 | 3.0 | 6200 | 1.5 | 0.251 |
| Ex.-10 | B | 20 | 9.3 | DEAC | 21.4 | 70 | 23 | 3.0 | 8100 | 1.7 | 0.756 |
| Ex.-11 | B | 20 | 7.4 | DEAC | 17.0 | 90 | 25 | 3.0 | 10500 | 1.6 | 0.712 |
| Comp. ex.-4 | C | 40 | 23.5 | DEAC | 50.2 | 80 | 20 | 1.0 | 2450 | 1.7 | 0.431 |

| | the second step polymerization | | | | polymer | total polymerization conditions | | |
|---|---|---|---|---|---|---|---|---|
| | conditions | | | | | | | |
| Example No. | temp. °C. | pressure Kg/cm²G | period hr | C= volume % | $C_2^=/C_3^=$ ratio g/g | polymerization ratio the 1st/the 2nd steps | yield Kg/hr | yield*2 g/g |
| Example-1 | 70 | 15 | 1.0 | 33 | 73/27 | 74.9/25.1 | 79.4 | 9400 |
| Example-2 | 80 | 14 | 1.0 | 32 | 75/25 | 75.1/24.9 | 78.2 | 8500 |
| Example-3 | 70 | 18 | 1.1 | 30 | 74/26 | 75.0/25.0 | 81.5 | 8000 |
| Example-4 | 70 | 18 | 1.2 | 33 | 72/28 | 74.4/25.6 | 82.5 | 7200 |
| Example-5 | 80 | 19 | 1.2 | 31 | 73/27 | 74.8/25.2 | 80.4 | 6700 |
| Comparative example-1 | 70 | 12 | 1.0 | 32 | 75/25 | 75.2/24.8 | 74.2 | 10300 |
| Comparative example-2 | 70 | 21 | 1.1 | 33 | 72/28 | 75.1/24.9 | 75.1 | 5300 |
| Example-6 | 70 | 15 | 1.0 | 31 | 73/27 | 74.9/25.1 | 79.9 | 9700 |
| Example-7*1 | 70 | 5 | 1.0 | 32 | 74/26 | 75.1/24.9 | 76.4 | 9000 |
| Comparative example-3 | 70 | 5 | 1.0 | 30 | 72/28 | 74.6/25.4 | 77.8 | 3470 |
| Example-8 | 80 | 7 | 1.0 | 32 | 75/25 | 74.8/25.2 | 80.5 | 5280 |
| Example-9*3 | 80 | 15 | 1.0 | 33 | 73/27 | 74.8/25.2 | 79.6 | 8290 |
| Example-10 | 70 | 15 | 1.0 | 33 | 74/26 | 75.4/24.6 | 78.5 | 10740 |
| Example-11 | 70 | 11 | 1.0 | 35 | 72/28 | 74.3/25.7 | 77.5 | 14130 |
| Comparative example-4 | 80 | 14 | 1.0 | 32 | 75/25 | 75.6/24.4 | 76.2 | 3240 |

| | modified polypropylene | | | | | | long period operation state*4 | |
|---|---|---|---|---|---|---|---|---|
| Ex. No. | $C_2^=$ content wt. % | MFR g/10 min. | extraction ratio wt. % | compression ratio % | izod strength Kg-cm/cm +23° C. | drop impact strength $-20°$ C. Kg-cm | bending modulus Kg/cm² | recycle pipings in the first step*5 | others |
| Ex.-1 | 18.3 | 2.1 | 4.2 | 15.6 | 74 | 20 | 450 | 6700 | little |
| Ex.-2 | 18.7 | 2.6 | 4.0 | 15.0 | 73 | 19 | 390 | 6800 | little |
| Ex.-3 | 18.5 | 2.2 | 3.8 | 14.9 | 75 | 21 | 320 | 6750 | little |
| Ex.-4 | 18.4 | 2.0 | 3.7 | 15.5 | 72 | 20 | 280 | 6720 | almost |

TABLE 1-continued

| | | | | | | | | | | |
|---|---|---|---|---|---|---|---|---|---|---|
| Ex.-5 | 18.4 | 1.9 | 3.5 | 14.5 | 74 | 19 | 240 | 6740 | nothing almost nothing | |
| Comp. ex.-1 | 18.6 | 2.4 | 5.5 | 16.8 | 75 | 20 | 460 | 6800 | very much | after 24 hrs, recycle gas lines in the first step polymerization vessel were blocked → operation stop |
| Comp. ex.-2 | 18.9 | 2.2 | 3.3 | 14.5 | 72 | 21 | 50 | 6760 | almost nothing | |
| Ex.-6 | 18.6 | 2.0 | 4.0 | 15.0 | 76 | 22 | 420 | 6720 | little | |
| Ex.-7 | 18.4 | 2.3 | 5.5 | 17.2 | 72 | 20 | 460 | 6300 | little | |
| Comp. ex.-3 | 18.3 | 2.3 | 11.9 | 34.1 | 73 | 20 | 470 | 6700 | little | |
| Ex.-8 | 18.9 | 2.4 | 6.7 | 28.4 | 74 | 19 | 460 | 6650 | little | after 15 hrs, coagulation was occurred in the second step polymerization vessel and stirrer was stopped |
| Ex.-9 | 18.4 | 2.1 | 5.2 | 17.9 | 74 | 22 | 440 | 5980 | little | |
| Ex.-10 | 18.2 | 2.4 | 4.5 | 17.2 | 75 | 20 | 470 | 6740 | little | |
| Ex.-11 | 18.5 | 2.0 | 4.0 | 16.4 | 72 | 19 | 420 | 6750 | little | |
| Comp. ex.-4 | 18.3 | 2.0 | 11.5 | 33.8 | 75 | 21 | 450 | 6800 | little | after 13 hrs, stirrer of the second step polymerization vessel was stopped |

*[1] 2.31 g/hr of methyl para toluate was introduced in the first step polymerization vessel.
*[2] yield (g) of polymer formed per 1 g of titanium trichloride composition
*[3] $C_2^=$ was fed in the first step polymerization (gas phase $C_2^=$ concentration: 0.2 volume %).
$C_2^=$ content of the first step polymer was 3 weight %.
*[4] continuous operation
*[5] the degree of fine powders accumulated in recycle gas pipings in the first step polymerization vessel

TABLE 2

| | catalyst system | | | | the first step polymerization | | | | | |
|---|---|---|---|---|---|---|---|---|---|---|
| | titanium trichloride composition | | organic aluminum | | conditions | | | | polymer | |
| Ex. No. | kind | average particle size, μ | kind | amount g/hr | temp. °C. | pressure Kg/cm²G | period hr | yield*2 g/g | [η] dl/g | specific surface area M²/g |
| | | amount g/hr | | | | | | | | |
| Comp. ex.-5 | A | 32 | 10.8 | DEAC | 24.8 | 80 | 18 | 3.0 | 7250 | — | 0.451 |
| Comp. ex.-6 | C | 30 | 11.7 | DEAC | 26.9 | 80 | 18 | 3.0 | 6800 | 1.8 | 0.358 |
| Ex.-12 | A | 32 | 11.2 | DEAC | 25.8 | 70 | 20 | 3.0 | 6900 | 1.9 | 0.412 |
| Ex.-13 | C | 30 | 11.3 | DEAC | 26.0 | 90 | 18 | 3.0 | 7100 | 1.9 | 0.452 |
| Ex.-14 | B | 30 | 11.3 | DEAC | 26.0 | 90 | 18 | 3.0 | 7200 | 1.9 | 0.419 |
| Ex.-15 | B | 30 | 10.8 | DEAC | 24.8 | 80 | 19 | 3.0 | 7000 | 1.5 | 0.492 |
| Comp. ex.-7 | A | 32 | 11.6 | DEAC | 26.6 | 70 | 20 | 3.0 | 6800 | 1.9 | 0.521 |
| Comp. ex.-8 | A | 32 | 11.3 | DEAC | 26.0 | 90 | 17 | 3.0 | 7100 | 2.0 | 0.435 |
| Comp. ex.-9 | C | 30 | 10.5 | DEAC | 24.2 | 70 | 20 | 3.0 | 7200 | 1.5 | 0.378 |
| Comp. ex.-10*6 | C | 40 | 9.5 | DEAC | 21.6 | 80 | 20 | 3.0 | 6750 | 1.7 | 0.315 |
| Ex.-16*7 | C | 40 | 9.3 | DEAC | 21.5 | 90 | 20 | 3.0 | 7120 | 1.6 | 0.357 |
| Comp. ex.-11*8 | D | 20 | 7.9 | TEA | 74.0 | 80 | 10 | 2.0 | 7100 | 1.7 | 0.756 |

| | the send step polymerization | | | | | | | |
|---|---|---|---|---|---|---|---|---|
| | conditions | | | | polymer | total polymerization conditions | | |
| Example No. | temp. °C. | pressure Kg/cm²G | period hr | $C_2^=$ in gas phase volume % | $C_2^=/C_3^=$ ratio g/g | polymerization ratio the 1st/the 2nd steps | yield Kg/hr | yield*2 g/g |
| Comparative example-5 | — | — | — | — | — | 100/0 | 78.6 | 7250 |
| Comparative example-6 | 70 | 20 | 2.5 | 4 | 15/85 | 73.3/26.7 | 79.4 | 9280 |
| Example-12 | 70 | 20 | 1.5 | 5 | 32/68 | 84.1/15.9 | 77.6 | 8200 |
| Example-13 | 70 | 14 | 1.1 | 22 | 62/38 | 86.5/13.5 | 80.5 | 8210 |
| Example-14 | 80 | 10 | 1.0 | 35 | 75/25 | 84.9/15.1 | 76.8 | 8480 |
| Example-15 | 90 | 10 | 1.0 | 40 | 85/15 | 75.9/24.1 | 75.4 | 9220 |
| Comparative example-7 | 90 | 7 | 1.0 | 70 | 97/3 | 75.8/24.2 | 79.1 | 8970 |
| Comparative example-8 | 70 | 3 | 1.0 | 22 | 72/28 | 95.6/4.4 | 80.3 | 7430 |
| Comparative | 75 | 20 | 1.5 | 20 | 75/25 | 52.8/47.2 | 75.3 | 13640 |

TABLE 2-continued

| Ex. No. | | | | | | | | |
|---|---|---|---|---|---|---|---|---|
| example-9 Comparative example-10*6 | 70 | 7 | 0.5 | 23 | 71/29 | 73.9/26.1 | 86.8 | 9140 |
| Example-16*7 | 70 | 15 | 0.8 | 22 | 70/30 | 72.1/27.9 | 91.8 | 9870 |
| Comparative example-11*8 | 70 | 3 | 1.0 | 24 | 73/27 | 74.7/25.3 | 75.4 | 9500 |

| | modified polypropylene | | | | | | long period operation state*4 | |
|---|---|---|---|---|---|---|---|---|
| Ex. No. | $C_2^=$ content wt. % | MFR g/10 min. | extraction ratio wt. % | compression ratio % | izod strength Kg-cm/cm +23° C. | izod strength Kg-cm/cm −20° C. | drop impact strength Kg-cm | bending modulus Kg/cm² | recycle pipings in the first step*5 | others |
| Comp. ex.-5 | — | 2.4 | 1.2 | 6.8 | 4.8 | 3.8 | <5 | 13000 | little | |
| Comp. ex.-6 | 4.0 | 2.2 | 3.5 | 14.5 | 7.2 | 4.5 | 60 | 8400 | little | |
| Ex.-12 | 5.1 | 2.5 | 3.0 | 13.0 | 13.5 | 6.4 | 85 | 10000 | little | |
| Ex.-13 | 8.4 | 2.3 | 2.8 | 12.3 | 19.3 | 10.4 | 280 | 10500 | little | |
| Ex.-14 | 11.3 | 8.5 | 2.5 | 8.5 | 10.9 | 6.7 | 310 | 11000 | little | |
| Ex.-15 | 20.5 | 2.4 | 3.3 | 15.2 | 59 | 14.7 | 400 | 7200 | little | |
| Comp. ex.-7 | 23.5 | 2.1 | 1.5 | 7.2 | 5.3 | 4.2 | 12 | 12000 | little | |
| Comp. ex.-8 | 3.1 | 2.3 | 1.4 | 7.5 | 5.9 | 4.7 | 30 | 11700 | little | |
| Comp. ex.-9 | 35.4 | 2.1 | 11.9 | 34.1 | >100 | @−40° C. 45 | >480 | 5300 | little | after 2 hrs, coagulation was occurred and stirred of the 2nd step polymerization vessel was stopped |
| Comp. ex.-10 | 18.5 | 2.0 | 13.1 | 36.5 | 70 | 14.8 | 400 | 6500 | little | after 10 hrs, stirrer of the 2nd step polymerization vessel was stopped |
| Ex.-16 | 19.5 | 2.3 | 4.5 | 16.7 | 72 | 19.7 | 450 | 6800 | little | |
| Comp. ex.-11 | 18.5 | 2.0 | 14.5 | 37.2 | 75 | 14.5 | 400 | 5800 | little | [ same as above |

*⁶4.0 g/hr of TEA was introduced in the second step polymerization vessel
*⁷1.0 g/hr of TEA was introduced in the second step polymerization vessel
*⁸5.1 g/hr of methyl para toluate was introduced in the first step polymerization vessel
*²same as in Table 1
*², *⁴, *⁵same as in Table 1

TABLE 3

| | catalyst system | | | | the first step polymerization | | | | | | |
|---|---|---|---|---|---|---|---|---|---|---|---|
| | titanium trichloride | | organic aluminum | | conditions | | | | polymer | | |
| | composition | | | | | | | | | | specific |
| Ex. No. | kind | average particle size, μ | kind | amount g/hr | temp. °C. | pressure Kg/cm²G | period hr | yield*² g/g | [η] dl/g | surface area, M²/g |
| Ex.-17*9 | C | 40 | 9.2 | DEAC | 19.3 | 80 | 20 | 3.0 | 6030 | 1.8 | 0.251 |
| Comp. ex.-12*10 | A | 30 | 8.1 | DEAC | 20.7 | 80 | 20 | 3.0 | 6980 | 1.7 | 0.007 |
| Comp. ex.-13*10 | B | 20 | 9.5 | DEAC | 21.6 | 80 | 20 | 3.0 | 7150 | 1.6 | 0.012 |
| Comp. ex.-14*10 | D | 15 | 11.3 | TEA | 105.9 | 80 | 10 | 3.0 | 6870 | 1.8 | 0.012 |
| Comp. ex.-15*10 | C | 40 | 8.5 | DEAC | 22.6 | 80 | 20 | 3.0 | 6630 | 1.5 | 0.005 |

| | the second step polymerization conditions | | | | polymer | total polymerization conditions | | |
|---|---|---|---|---|---|---|---|---|
| Example No. | temp. °C. | pressure Kg/cm²G | period hr | $C_2^=$ in gas phase volume % | $C_2^=/C_3^=$ ratio g/g | polymerization ratio the 1st/the 2nd steps | yield Kg/hr | yield*² g/g |
| Example-17*9 | 70 | 15 | 1.0 | 32 | 74/26 | 76.5/23.5 | 72.5 | 7882 |
| Comparative example-12*10 | 70 | 18 | 0.7 | 35 | 78/22 | 75.8/24.2 | 74.6 | 9208 |
| Comparative example-13*10 | 80 | 15 | 0.8 | 33 | 73/27 | 75.2/24.8 | 90.3 | 9508 |
| Comparative example-14*10 | 70 | 5 | 1.0 | 30 | 70/30 | 78.6/21.4 | 98.8 | 8740 |
| Comparative example-15*10 | 70 | 15 | 1.0 | 35 | 75/25 | 75.9/24.1 | 74.2 | 8735 |

| | modified polypropylene | | | | | | | long period operation state*3 | |
|---|---|---|---|---|---|---|---|---|---|
| Ex. No. | $C_2^=$ content wt. % | MFR g/10 min. | extraction ratio wt. % | compression ratio % | izod strength Kg-cm/cm +23° C. | izod strength Kg-cm/cm −20° C. | drop impact strength Kg-cm | bending modulus Kg/cm² | recycle pipings in the first step*4 | others |

TABLE 3-continued

| | | | | | | | | | |
|---|---|---|---|---|---|---|---|---|---|
| Ex.-17 | 17.4 | 2.8 | 3.7 | 15.9 | 72 | 17 | 410 | 6900 | little | |
| Comp. ex.-12 | 18.9 | 2.4 | 4.5 | 32.5 | 68 | 15 | 450 | 6700 | little | after 10 hrs, coagulation was occurred and stirrer was stopped in the second step |
| Comp. ex.-13 | 18.1 | 2.0 | 5.3 | 34.1 | 75 | 19 | 400 | 6800 | little | after 15 hrs, coagulation was occurred and stirrer was stopped in the second step |
| Comp. ex.-14 | 15.0 | 2.6 | 5.8 | 38.5 | 80 | 21 | 430 | 6200 | little | after 13 hrs, coagulation was occurred and stirrer was stopped in the second step |
| Comp. ex.-15 | 18.1 | 2.8 | 2.7 | 35.4 | 78 | 18 | 420 | 6800 | little | after 12 hrs, coagulation was occurred and stirrer was stopped in the second step |

*[9] 24 mg/hr of diethylene dimethyl ether was introduced in the first step polymerization vessel.
*[10] rotation speed of the first step polymerization vessel was 30 r.p.m.

We claim:

1. In a process for producing ethylene-propylene block copolymer by the use of a catalyst employed for producing isotactic polypropylene, the process for producing a modified polypropylene which is characterized in that a gas phase polymerization of propylene is substantially carried out in the presence of the catalyst obtained by combining a titanium trichloride composition with an average particle size of $10 \sim 100\mu$ and an organic aluminum to form the propylene polymer segment with a specific surface area more than $0.015$ m$^2$/g at an yield of more than 3,000 g per 1 g of the titanium trichloride composition in the first step, and then a gas phase polymerization of a mixture of polypropylene and ethylene is successively carried out in the second step to form the copolymer segment with a copolymerization ratio of propylene:ethylene being $5 \sim 80$ weight %:$95 \sim 20$ weight %, wherein the polymerized amount of the second step is $10 \sim 40$% of total polymerized amount and wherein normal hexane extraction ratio (75° C., 1 hour) of the ethylene-propylene block copolymer powders obtained is $1 \sim 10$ weight %.

2. The process according to claim 1, wherein the titanium trichloride composition is one obtained by reacting titanium tetrachloride, an organic aluminum compound and an organic ether and treating them with titanium tetrachloride, an ether compound or a reaction product of titanium tetrachloride and an ether compound, and wherein the organic aluminum compound is diethyl aluminum chloride.

3. The process according to claim 2, wherein less than 0.15 (molar ratio) of triethyl aluminum is used per diethyl aluminum chloride.

4. The process according to claim 1, wherein the titanium trichloride composition is prepared from the reaction product obtained by reacting magnesium hydroxide with aluminum chloride, as well as ethyl benzoate, silicon tetrachloride and titanium tetrachloride, and wherein the organic aluminum compound is triethyl aluminum.

5. The process according to claim 4, wherein from 0.01 to 0.25 (molar ratio) of methyl para toluate is used per triethyl aluminum.

* * * * *